United States Patent Office 3,175,012
Patented Mar. 23, 1965

3,175,012
STABILIZATION OF CHLOROBUTADIENE MONO-
MERS WITH NITROGEN TETROXIDE DIISO-
BUTYLENE ADDITION PRODUCT
George P. Colbert, Louisville, Ky., assignor to E. I. du
Pont de Nemours and Company, Wilmington, Del., a
corporation of Delaware
No Drawing. Filed Feb. 28, 1962, Ser. No. 176,442
4 Claims. (Cl. 260—652.5)

This invention is directed to the manufacture of chlorobutadienes, specifically 2-chloro-1,3-butadiene (chloroprene) and 2,3-dichloro-1,3-butadiene, and more particularly to a novel method for preventing the formation of undesirable granular polymers during the distillation and storage of said chlorobutadienes.

The problem of the formation of granular polymers of chloroprene (first described by Carothers et al. J.A.C.S. 53, 4205 (1931) and also called omega polymers) during its process of manufacture and storage is serious and has so far been only partly solved. Thus the addition of small amounts of the addition product of 1,3-dichloro-2-butene and nitrogen dioxide described in U.S. Patent 2,770,657 is effective, for both 2-chloro-and 2,3-dichlorobutadienes, but contributes an odor to the plastic polymers made from the monomers thus stabilized. The presence of ion-exchange resins containing nitrite ions as described in U.S. Patent 2,842,602 is effective but these resins are inconvenient to handle in process operation, since they are insoluble solids. Butyraldoxime, used in U.S. Patent 2,947,795, for stabilizing monovinylacetylene, is also effective for 2-chloro-1,3-butadiene but has the disadvantage of also retarding its polymerization to the desired plastic polymers.

As already pointed out in the patents referred to heretofore, the formation of granular (omega) polymers of 2-chloro- and of 2,3-dichloro-butadienes, the so-called popcorn or cauliflower polymers are particularly troublesome in the manufacture of these monomers. These granular polymers form in both liquid and vapor phases, appear to increase in amount exponentially, and rapidly close passageways in the equipment and finally fill all space to which the monomer is supplied. Being insoluble in all solvents, the granular polymers can only be removed mechanically. This involves frequent shut-downs, with replacement or careful cleaning of the affected parts of the equipment. Moreover, since granular polymer already formed is a catalyst for further polymerization, polymerization starts again at once unless all traces (seeds) of polymer have been removed.

It is, therefore, an object of this invention to provide a new and novel method effective for inhibiting the heretofore described type of granular polymerization which process is significantly free from the disadvantages of the methods now known in the art.

These and other objects will become apparent in the following description and claims.

More specifically, the present invention is directed to the method of stabilizing a polymerizable chlorobutadiene monomer selected from the group consisting of 2-chloro-1,3-butadiene and 2,3-dichloro-1,3-butadiene, against the formation of granular polymers by incorporating therein the addition product of diisobutylene and nitrogen tetroxide in amount equivalent to at least 5 and preferably not more than 200 parts of nitrogen tetroxide per million parts by weight of said monomer.

The principal chlorobutadienes which are readily polymerizable and with which the formation of granular polymers is a serious problem are 2-chloro-1,3-butadiene and 2,3-dichloro-1,3-butadiene.

As little as 5 p.p.m. of combined $N_2O_4$ from the diisobutylene addition product has an inhibiting effect on the formation of granular polymer but ordinarily 10 to 100 parts is used, the larger amounts being usually needed for the dichlorobutadiene and at higher temperatures. In some cases 100 to 200 parts or more is desirable but still larger amounts give little additional effect, add to the cost, and introduce foreign material. The inhibition of granular polymer formation according to the present invention occurs from below 0° to about 100° C.

Diisobutylene is a name given to 2,4,4-trimethyl-1-pentene, 2,4,4-trimethyl-2-pentene, and mixtures of the two. Such a mixture containing about 75% of the first isomer and made by dimerizing isobutylene, is entirely satisfactory as the starting material for the addition product used in the present invention, although either pure isomer may also be used.

The addition product with nitrogen tetroxide, $N_2O_4$, is conveniently made by passing the $N_2O_4$ into the diisobutylene. One mol of the latter absorbs one mole of $N_2O_4$. The addition product is a bluish green liquid and is a mixture of compounds of several types, since its infrared spectrum indicates the presence of nitro, nitroso, and nitrate groups, along with smaller amounts of oxime and nitro-alcohol structures. It is usually most convenient to introduce only about 10% of $N_2O_4$ by weight into the diisobutylene corresponding to about 12% of the theoretical quantity, using the unreacted part of the hydrocarbon as solvent. The reaction may also be carried out in an inert solvent such as toluene.

In addition to toluene which may be utilized as solvent for preparation of the nitrogen tetroxide addition products, other aromatic hydrocarbons or aliphatic hydrocarbons such as petroleum ether or chlorinated hydrocarbons such as chloroform and carbon tetrachloride may be utilized. The solvent should preferably boil below about 120° C. In any case, it is best to use a dilute solution of the product in the present invention because of greater accuracy thus obtainable in measuring the small quantities which must be added. A convenient temperature for the reaction is between 30 and 40° C., but temperatures from 0 to 60° or higher may also be used. Below 0° C., the formation of oximes appears to be favored and the product is less effective as a stabilizer.

Specifically, a solution of the addition product suitable for use according to the present invention may be made by passing commercial diisobutylene (containing 75% of the pentene-1, 23% of the pentene-2 isomer and 2% of other pentene isomers), at the rate of 270 lbs. per hour and nitrogen tetroxide, at the rate of 27 lbs. per hour, into a glass flask of 1.3 gal. capacity. The gas is introduced through a sparger and the temperature is kept at 30–40° C. by circulating part of the reaction mass through a coil cooled to 0° C. The partly reacted mixture is then passed successively through two three-gallon flasks kept at 30–35° C. to complete the reaction. The resulting bluish green solution containing about 10% of combined $N_2O_4$ is ready for use.

Representative examples illustrating the present invention follow.

*Example 1*

The inhibiting action of the diisobutylene $N_2O_4$ reaction product made as heretofore described is determined by adding to 100 g. of chloroprene enough of the solution to furnish 0.001 g. of combined $N_2O_4$ (10 p.p.m.). After adding phenothiazine (to inhibit the normal polymerization of the chloroprene to the plastic polymer) and a fresh, active seed 1 mm. in diameter of the granular polymer, sweeping with nitrogen, and sealing the container, the system is kept at 25° C. and observed for increase in the size of the seed. No change occurs in nine days. The diisobutylene addition product in the chloroprene has no effect on the rate at which it can be polymerized in aqueous emulsion in the presence of the usual amounts of persulfate catalyst to form plastic polychloroprene. This is without the odor which the 1,3-dichlorobutene NO₂ product imparts when used as a stabilizer.

*Example 2*

To simulate the conditions leading to the formation of granular polymer during the refining of chloroprene by distillation, chloroprene containing 150 p.p.m. of phenothiazine is fed by gravity downward from a reservoir and then upward through an inclined stainless steel tube jacket with steam. The resulting vapor is condensed by a reflux condenser and returned to the reservoir. With 15 p.p.m. of $N_2O_4$ in the form of the addition product with diisobutylene in the chloroprene being thus circulated through the simulated still, no deposit appears in six hours. Without the addition of the inhibitor, the heated tube becomes completely plugged in two hours. Operation of this test for six hours as heretofore described without formation of polymer is considered to be a good indication that the inhibitor added in the same amount to the chloroprene fed a continuous vacuum still would prevent formation of granular polymer. This is confirmed by actual process operation, using enough of the diisobutylene-$N_2O_4$ addition product to give 15 p.p.m. of $N_2O_4$ in the chloroprene fed to the still.

*Example 3*

The solution of diisobutylene-$N_2O_4$ addition product is added continuously as follows at various points in the process in which 2,3-dichloro-1,3-butadiene is steam distilled continuously from its crude reaction mixture and further purified by vacuum distillation at 40 mm. The quantities are given as usual in parts of combined $N_2O_4$ per million of dichlorobutadiene.

| | |
|---|---|
| To condenser for crude distillate | 100 |
| To reflux in vacuum still | 33 |
| To feed to vacuum still | 66 |

With the inhibitor supplied at these rates, the still operates satisfactorily without formation of granular polymer.

It is considered pertinent to not that many addition products of olefins and $N_2O_4$ are unsuitable for the present purpose. As already pointed out, the addition product of 1,3-dichlorobutene imparts an odor. The products from octene-1 and from cyclohexene are insoluble. The product from cyclopentene, while soluble, is much less effective as an inhibitor.

The preceding representative examples may be varied within the scope of the present total specification disclosure, as understood and practiced, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A chlorobutadiene monomer selected from the group consisting of 2-chloro-1,3-butadiene and 2,3-dichloro-1,3-butadiene being stabilized against the formation of granular polymers by having incorporated therein the addition product of diisobutylene and nitrogen tetroxide in an amount equivalent to at least 5 and not more than 200 parts of nitrogen tetroxide per million parts by weight of said monomer.

2. The chlorobutadiene as described in claim 1 wherein said amount of addition product is equivalent to 10 to 100 parts of nitrogen tetroxide per million parts by weight of said monomer.

3. The composition as described in claim 1 wherein said monomer is 2-chloro-1,3-butadiene.

4. The composition as described in claim 1 wherein said monomer is 2,3-dichloro-1,3-butadiene.

References Cited by the Examiner

UNITED STATES PATENTS

| | | | |
|---|---|---|---|
| 1,950,438 | 3/48 | Carothers | 260—252.5 |
| 2,770,657 | 11/56 | Hively | 260—252.5 |
| 2,999,119 | 9/61 | McKinnis | 260—252.5 |

FOREIGN PATENTS 878,118  9/61  Great Britain.

LEON ZITVER, *Primary Examiner.*